United States Patent
Hein

(10) Patent No.: US 9,404,577 B2
(45) Date of Patent: Aug. 2, 2016

(54) PISTON PIN

(71) Applicant: Mahle International GmbH, Stuttgart (DE)

(72) Inventor: Manfred Hein, Leonberg (DE)

(73) Assignee: Mahle International GmbH (DE)

(*) Notice: Subject to any disclaimer, the term of this patent is extended or adjusted under 35 U.S.C. 154(b) by 0 days.

(21) Appl. No.: 14/383,901

(22) PCT Filed: Mar. 6, 2013

(86) PCT No.: PCT/EP2013/054471
§ 371 (c)(1),
(2) Date: Sep. 8, 2014

(87) PCT Pub. No.: WO2013/131939
PCT Pub. Date: Sep. 12, 2013

(65) Prior Publication Data
US 2015/0136063 A1   May 21, 2015

(30) Foreign Application Priority Data
Mar. 9, 2012 (DE) .......................... 10 2012 203 744

(51) Int. Cl.
*F02F 3/00* (2006.01)
*F16J 1/16* (2006.01)
*F02B 3/06* (2006.01)
*F02F 3/22* (2006.01)

(52) U.S. Cl.
CPC .... *F16J 1/16* (2013.01); *F02B 3/06* (2013.01); *F02F 3/00* (2013.01); *F02F 3/22* (2013.01); *F05C 2201/021* (2013.01); *F05C 2201/0448* (2013.01); *Y10T 403/25* (2015.01)

(58) Field of Classification Search
CPC .................. F05C 2201/021; F05C 2201/0448; F02F 3/22; F02F 3/00; F02B 3/06
USPC .......................................................... 123/193.6
See application file for complete search history.

(56) References Cited

U.S. PATENT DOCUMENTS

| | | | |
|---|---|---|---|
| 2,625,448 A * | 1/1953 | Underwood | 384/291 |
| 2,849,265 A | 8/1958 | Ten Eyck | |
| 3,053,595 A | 9/1962 | Dilworth | |
| 3,808,955 A * | 5/1974 | Hamada et al. | 92/169.1 |
| 4,297,975 A | 11/1981 | Galli | |
| 5,686,119 A * | 11/1997 | McNaughton, Jr. | 425/130 |

(Continued)

FOREIGN PATENT DOCUMENTS

| CN | 1573064 A | 2/2005 |
|---|---|---|
| DE | 2901443 A1 | 12/1979 |

(Continued)

OTHER PUBLICATIONS

English abstract for DE-10237923.

(Continued)

*Primary Examiner* — Lindsay Low
*Assistant Examiner* — Charles Brauch
(74) *Attorney, Agent, or Firm* — Fishman Stewart PLLC

(57) ABSTRACT

A piston pin for connecting a small connecting rod eye of a connecting rod with a piston of an internal combustion engine may include an inner bore with an eccentricity relative to an outer surface of the piston pin. The eccentricity may amount to a maximum of 0.5 mm. The outer surface may include spiral-shaped lubricating grooves.

18 Claims, 1 Drawing Sheet

(56) References Cited

U.S. PATENT DOCUMENTS

| | | | |
|---|---|---|---|
| 7,228,786 B2 | 6/2007 | Hamada et al. | |
| 2010/0326390 A1* | 12/2010 | Gurler | 123/192.2 |

FOREIGN PATENT DOCUMENTS

| | | | |
|---|---|---|---|
| DE | 19704224 | A1 | 8/1997 |
| DE | 10237923 | A1 | 3/2004 |
| DE | 102009032938 | A1 | 1/2011 |
| EP | 1389700 | A2 | 2/2004 |
| JP | 06101759 | | 4/1994 |
| JP | 07317599 | | 12/1995 |
| WO | WO-93/20369 | A1 | 10/1993 |
| WO | WO-2006/061013 | A1 | 6/2006 |

OTHER PUBLICATIONS

English abstract for DE-19704224.
English abstract for DE-102009032938.
English abstract for EP-1389700.
English abstract JP-06101759.
English abstract for JP-07317899.
Search Report for DE-102012203744.6, mailed Oct. 5, 2012.

* cited by examiner ular 1

PISTON PIN

CROSS-REFERENCE TO RELATED APPLICATIONS

This application claims priority to International Patent Application PCT/EP2013/054471 filed Mar. 6, 2013 and German Patent Application No. 10 2012 203 744.6 filed Mar. 9, 2012, the contents of which are hereby incorporated by reference in their entirety.

TECHNICAL FIELD

The present invention relates to a piston pin for connecting a small connecting rod eye of a connecting rod to a piston of an internal combustion engine according to the preamble of claim 1. The invention additionally relates to an internal combustion engine with at least one piston, which is connected to a connecting rod via such a piston pin.

BACKGROUND

From DE 10 2009 032 938 A1 a generic piston pin for connecting the small connecting rod eye of a clamp-type connecting rod to a piston of an internal combustion engine is known, wherein the piston comprises hub bores for receiving the piston pin and wherein the piston pin comprises an inner bore. Here it is provided that the inner bore has an eccentricity relative to the outer surface of the piston pin, which allows embodying the volume of the inner bore larger and because of this achieve a material saving, in particular also a weight saving.

From U.S. Pat. No. 2,849,265 a further generic piston pin is known.

From U.S. Pat. No. 3,053,595 B a piston pin with an eccentric inner bore is known. The connecting rod and the piston pin in this case are connected to one another in a rotationally fixed manner by two screws.

Usually, the piston pin connects the connecting rod with the piston of the internal combustion engine, wherein the connecting rod in turn connects the piston with the crankshaft. The small connecting rod eye of the connecting rod facing the piston in this case is arranged aligned with the hub bores, which are introduced in pin hubs provided on the piston. The pin hubs and the connecting rod eyes count among the regions of a piston that are subjected to the highest load because the piston pin cannot only bend during the oscillating movement of the piston because of the huge forces acting on the piston but because the piston pin can also rub on the hub bores and the small connecting rod eye.

SUMMARY

The present invention deals with the problem of stating an improved or at least an alternative embodiment for a piston pin of the generic type, which in particular has an increased resistance to wear.

According to the invention, this problem is solved through the subjects of the independent claims. Advantageous embodiments are subject of the dependent claims.

The present invention is based on the general idea of providing an inner bore penetrating the piston pin in axial direction in the case of a piston pin known per se for connecting a small connecting rod eye of a connecting rod with a piston of an internal combustion engine with an eccentricity relative to the outer surface of the piston pin, wherein this eccentricity according to the invention amounts to a maximum of 0.5 mm, i.e. few tenth of a millimeter and because of this does not negatively influence the mechanical strength of the piston pin. The provided eccentricity of a few tenth of a millimeter however is already sufficient in order to bring about in particular a rotation of the piston pin through corresponding forces of inertia at higher rotational speeds. Additionally, spiral-shaped lubricating grooves are arranged on the outer surface of the piston pin, which upon a rotation due to inertia of the piston pin bring about lubrication of the same in the hub bores or in the small connecting rod eye of the connecting rod and because of this substantially increase the wear resistance. The lubricating grooves in turn can comprise a depth of a few hundredth of a millimeter, wherein in such a small depth is already sufficient for bringing about adequate lubrication of the piston pin in the hub bores of the piston and in the small connecting rod eye. When the piston pin during the stroke movement of the piston during the operation of the internal combustion engine accelerates or decelerates, a force, because of the eccentric mass centre of gravity, acts with a small lever arm which leads to a rotational movement and thus to the rotation of the piston pin. Through the rotation, the advantageous effect can be additionally brought about that wear on the piston pin is evenly distributed over the entire circumference of the piston pin, as a result of which the wear resistance on the whole of the same in turn can be increased.

Practically, the piston pin is coated with a sliding varnish, in particular with a Tribocoat® and/or with an amorphous piston material, in particular with a diamond-like carbon (DLC). In order to simplify a possible movement of the piston pin within the connecting rod and in particular within the connecting rod aperture and/or within the hub bore in the piston or to reduce friction, the friction-reducing coating according to the invention is provided. DLC-coating are amorphous carbon layers, which in addition to increasing the wear resistance develop a friction-reducing effect.

Further important features and advantages of the invention are obtained from the subclaims, from the drawings and from the associated figure description with the help of the drawings.

It is to be understood that the features mentioned above and the features still to be explained in the following cannot only be used in the combination stated but also in other combinations or by themselves without leaving the scope of the present invention.

Preferred exemplary embodiments of the invention are shown in the drawings and are explained in more detail in the following description, wherein same reference numbers relate to same or similar or functionally same components.

BRIEF DESCRIPTION OF THE DRAWINGS

It shows, in each case schematically.

DETAILED DESCRIPTION

Figure 1:
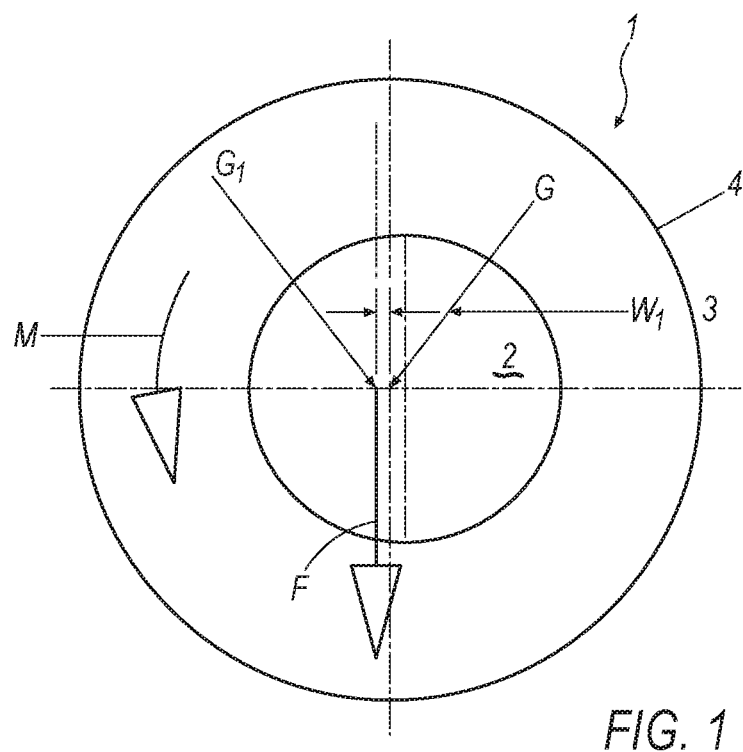
FIG. 1 a schematic representation of the eccentricity on a piston pin according to the invention, FIG. 2 a sectional representation and an axial view of the piston pin according to the invention, FIG. 3 a lateral view of the piston pin according to the invention.
Figure 2:
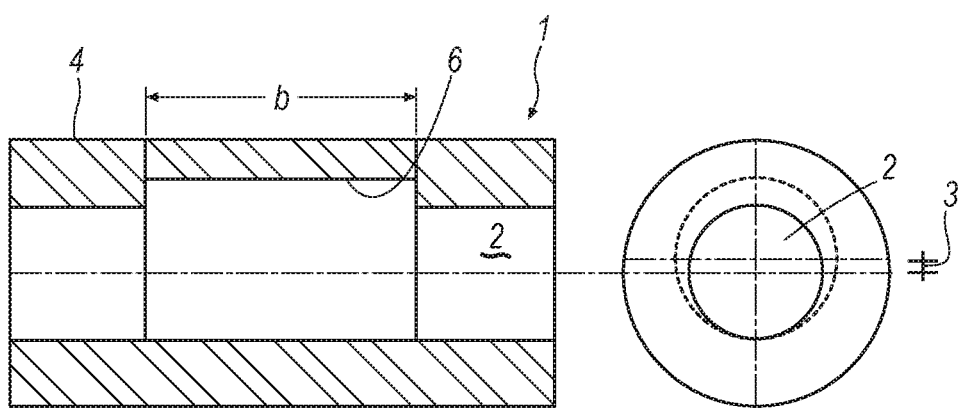
Figure 3:
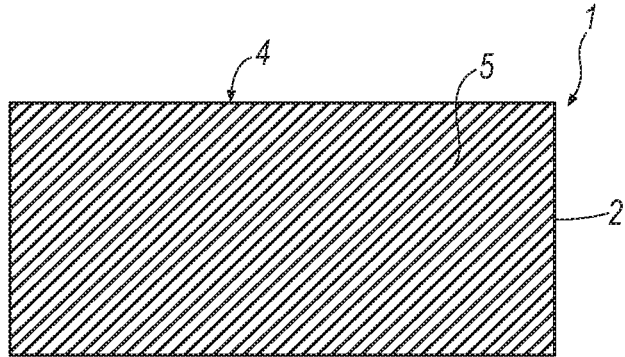

According to FIGS. 1 to 3, a piston pin 1 according to the invention for connecting a small connecting rod eye of a connecting rod which is not shown with a piston of an internal combustion engine which is likewise not shown comprises an inner bore 2 with an eccentricity 3 relative to the outer surface 4 of the piston pin 1. According to the invention, the eccentricity 3 now amounts to a maximum of 0.5 mm, i.e. a few tenth of a millimeter, but which are already sufficient for accelerating and decelerating the piston pin 1 during the stroke movement of the piston and because of this based on the eccentric mass centre of gravity $G_1$, a force F with a lever arm h leads to a rotational moment M and thus to a rotation of the piston pin 1. The eccentricity 3, which corresponds to the lever arm h, ensures a shift of the mass centre of gravity from originally G to $G_1$. As the name already expresses, the inner bore 2 is produced by means of a boring tool and is usually formed cylindrically. Alternatively, however, a conical design of the inner bore is also conceivable. The eccentricity 3 can for example be produced by means of a turning tool or by means of cold or hot extrusion. Looking at FIG. 2 it is evident that the eccentricity 3 extends over merely a middle region b of the piston pin 1, wherein it is obviously also conceivable that the eccentricity 3 extends over the entire axial length of the piston pin 1 or is arranged merely laterally, i.e. on a longitudinal end. As a second substantial feature, spiral-shaped lubricating grooves 5 (see FIG. 3) are arranged on the outer surface 4 of the piston pin 1, which have a depth of merely a few hundredth of a millimeter. Even this small depth already brings about conveying of lubricating oil, as a result of which friction, i.e. a frictional resistance of the piston pin 1 in the hub bores of the piston or in the small connecting rod eye can be reduced.

In order to further reduce the friction, the piston pin 1 on its outer surface 4 can be additionally or alternatively coated with a sliding varnish, in particular with a Tribocoat® and/or with an amorphous carbon, in particular with a diamond-like carbon (DLC). Such coatings reduce the frictional effect and additionally improve the wear resistance.

Through the shifted mass centre of gravity $G_1$ and the rotational moment M resulting from this, the piston pin 1 during the operation of the internal combustion engine is continuously rotated, as a result of which wear acting thereon is evenly distributed over the circumference of the piston pin 1. Unilateral and particular stressing friction can be excluded because of this.

The piston pin 1 usually has a diameter of 2 to 4 cm, depending on the size of the associated piston. As already mentioned, the eccentricity 3 can be configured in the middle, on a side or in section even step-like wherein the inner recess 6, which constitutes the eccentricity 3, can be produced for example through boring or turning. Likewise conceivable is that the inner recess 6 of the piston pin 1 is produced through cold or hot extrusion, wherein from both sides of the piston pin 1 mandrels are pressed into the solid pin material. Generally, the inner bore 2 can also be produced in this way, i.e. other than can be assumed by the name "bore".

Of particular advantage with the minor eccentricity 3 and with the comparatively small depth of the recess 6 is that the mechanical strength of the piston pin 1 is retained. The eccentricity 3 which is only a few tenth of a millimeter in size however is sufficient to bring about a force of inertia F in particular at higher rotational speeds of the internal combustion engine that is sufficient for the rotation of the piston pin 1.

The invention claimed is:

1. A piston pin for connecting a small connecting rod eye of a connecting rod with a piston of an internal combustion engine, comprising: an inner bore with an eccentricity relative to an outer surface of the piston pin, wherein:
the eccentricity amounts to a maximum of 0.5 mm,
the outer surface includes spiral-shaped lubricating grooves, and
the eccentricity extends over a middle region of the inner bore.

2. The piston pin according to claim 1, wherein the eccentricity amounts to a maximum of 0.2 mm.

3. The piston pin according to claim 1, further comprising a recess arranged in the inner bore, wherein at least one of the eccentricity and the recess is produced via at least one of cold and hot extrusion.

4. The piston pin according to claim 1, wherein the inner bore is formed at least one of cylindrically and conically.

5. The piston pin according to claim 1, wherein the lubricating grooves have a depth of a few hundredth of a millimeter.

6. The piston pin according to claim 1, wherein the outer surface is coated with a sliding varnish.

7. An internal combustion engine, comprising: at least one piston connected to a connecting rod via a piston pin;
the piston pin including an inner bore having an eccentricity relative to an outer surface of the piston pin, wherein the eccentricity is 0.5 mm or less, and the outer surface includes spiral-shaped lubricating grooves;
further comprising a recess arranged in the inner bore of the piston pin.

8. The internal combustion engine according to claim 7, wherein the eccentricity is 0.2 mm or less.

9. The internal combustion engine according to claim 7, wherein the recess defines the eccentricity.

10. The internal combustion engine according to claim 7 wherein at least one of the eccentricity and the recess is formed via at least one of cold and hot extrusion.

11. The internal combustion engine according to claim 7, wherein the inner bore is formed at least one of cylindrically and conically.

12. The internal combustion engine according to claim 7, wherein the eccentricity extends over a middle region of the inner bore.

13. The internal combustion engine according to claim 7, wherein the piston pin is coated with a sliding varnish.

14. The piston pin according to claim 3, wherein the inner bore is formed at least one of cylindrically and conically.

15. The piston pin according to claim 4, wherein the eccentricity extends over a middle region of the inner bore.

16. The piston pin according to claim 6, wherein the sliding varnish includes at least one of a Tribocoat® and an amorphous carbon.

17. The piston pin according to claim 16, wherein the amorphous carbon is a diamond-like carbon.

18. An internal combustion engine, comprising:
at least one piston connected to a connecting rod via a piston pin, the piston pin including an inner bore formed at least one of cylindrically and conically, and an outer surface having spiral-shaped lubricating grooves; and
wherein the inner bore has a recess defining an eccentricity relative to the outer surface of the piston pin of 0.5 mm or less, the eccentricity extending over a middle region of the inner bore.

* * * * *